United States Patent
Hemker et al.

(10) Patent No.: US 12,376,526 B2
(45) Date of Patent: Aug. 5, 2025

(54) HAYMAKING MACHINE WITH CATCHING ELEMENT

(71) Applicant: Maschinenfabrik Bernard Krone GmbH & Co. KG, Spelle (DE)

(72) Inventors: Johannes Hemker, Legden (DE); Erik Helper, Quendorf (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 762 days.

(21) Appl. No.: 17/721,775

(22) Filed: Apr. 15, 2022

(65) Prior Publication Data

US 2022/0330484 A1    Oct. 20, 2022

(30) Foreign Application Priority Data

Apr. 16, 2021 (DE) .................... 10 2021 109 631.6

(51) Int. Cl.
*A01D 78/10* (2006.01)
*A01D 80/00* (2006.01)

(52) U.S. Cl.
CPC .......... *A01D 78/1028* (2013.01); *A01D 78/10* (2013.01); *A01D 80/00* (2013.01)

(58) Field of Classification Search
CPC .......... A01D 78/00–78/20; A01D 80/00–80/02
See application file for complete search history.

(56) References Cited

U.S. PATENT DOCUMENTS

| | | | | |
|---|---|---|---|---|
| 4,015,411 | A * | 4/1977 | van der Lely | A01D 78/1085 56/366 |
| 4,601,162 | A * | 7/1986 | Wessel | A01D 78/1092 56/192 |
| 5,274,990 | A * | 1/1994 | Aron | A01D 78/1071 56/396 |
| 5,685,136 | A * | 11/1997 | Aron | A01D 78/1014 56/367 |
| 6,463,726 | B1 * | 10/2002 | Helfer | A01D 78/1085 56/370 |
| 2014/0196429 | A1 * | 7/2014 | Gantzer | A01D 84/00 56/377 |
| 2023/0345879 | A1 * | 11/2023 | Sasamoto | G07C 5/02 |

FOREIGN PATENT DOCUMENTS

DE    20 2009 003 439    7/2010
GB          1 569 278    6/1980

* cited by examiner

Primary Examiner — Joseph M Rocca
Assistant Examiner — Madeline I Runco
(74) Attorney, Agent, or Firm — Gudrun E. Huckett

(57) ABSTRACT

A haymaking machine has a rake rotor with frame and support arm provided with a base part and a sliding part. The base part is pivotably connected to the frame about a support arm axis to enable the support arm to pivot between a lowered active position and a raised passive position. The sliding part is slidable relative to the base part between an inner position and an outer position for length adjustment of the support arm. The outer position is farther removed from the support arm axis than the inner position. A catching element is connected to the sliding part. A linear drive is connected to frame and sliding part to move the sliding part into the inner position and pivot the support arm from active position into passive position. A retaining mechanism holds the support arm in active position until the sliding part has reached the inner position.

9 Claims, 5 Drawing Sheets

HAYMAKING MACHINE WITH CATCHING ELEMENT

BACKGROUND OF THE INVENTION

The present invention concerns a haymaking machine with a rake rotor as well as a catching element correlated therewith which is connected to a frame by a support arm, wherein a base part of the support arm is connected to the frame so as to be pivotable about a support arm axis in order to pivot the support arm between a lowered active position and a raised passive position, and a sliding part, to which the catching element is connected, is slidable relative to the base part between an inner position and an outer position that is farther removed from the support arm axis in order to effect a length adjustment of the support arm.

Haymaking machines such as tedders or rakes serve in agriculture to turn (or tedder) cut grass or hay on the field and/or to collect it to swaths. A conventional type of haymaking machine uses one or a plurality of rotating rake rotors in which a plurality of tine arms are rotating about a common axis, respectively. Each tine arm supports at the end a plurality of tines that can be guided close to the ground across the field and thereby engage the stalk material. The engaged stalk material is entrained across a certain travel distance by the tines before it is thrown off or up and lands again on the field at a different location. In order to control the deposition location at least approximately, at least one catching element (e.g., a crop curtain) is often provided that can be arranged in an active position radially outside of the movement path of the tines. While the catching element in the active position is extending approximately vertically, it is connected to the frame of the haymaking machine by a support arm that is extending approximately horizontally and can be connected e.g. in the vicinity of the rotation axis of the rake rotor to the frame. Generally, an e.g. bracket-type rotor protection is also connected to the support arm which, in the active position, is arranged radially outside and above the movement path of the rake rotor in order to prevent collisions of the rotating tines with other objects. In this context, it is known, on the one hand, to pivot the support arm with the catching element upwardly into a passive position when the catching element is not required or when the width of the haymaking machine must be reduced e.g. for traveling on a road. On the other hand, it is known to adjust in the active position the length of the support arm, i.e., to extend and retract the latter, in order to position the catching element at a different radial distance in relation to the rotation axis. In this way, e.g. the width of a laid swath can be varied. Pivoting, on the one hand, as well as extending of the support arm, on the other hand, are carried out nowadays by a motor drive by means of two separate drive elements, e.g. hydraulic cylinders.

Object of the invention is to propose a reliable as well as simplified adjusting mechanism for a catching element of a rake rotor.

SUMMARY OF THE INVENTION

The object is solved by a haymaking machine characterized in that by a linear drive, acting between the frame and the sliding part, the sliding part is movable into the inner position and the support arm is pivotable into the passive position, wherein a retaining mechanism is configured to hold the support arm in the active position until the sliding part has reached the inner position.

Advantageous embodiments can be taken from the dependent claims.

For this purpose, a haymaking machine is created with a rake rotor as well as a catching element correlated therewith which is connected to a frame by a support arm, wherein a base part of the support arm is connected to the frame so as to be pivotable about a support arm axis in order to pivot the support arm between a lowered active position and a raised passive position, and a sliding part, to which the catching element is connected, is slidable relative to the base part between an inner position and an outer position that is farther removed from the support arm axis in order to effect a length adjustment of the support arm.

The haymaking machine is provided generally in order to engage stalk material such as grass or hay on a field, to turn it, to distribute it and/or combine it to swaths. It can be provided in particular so as to be pulled by a towing machine or a tractor. For this purpose, a frame of the haymaking machine can be coupled by a drawbar to the tractor. At least one rake rotor, often a plurality of rake rotors, is arranged at the frame. Each rake rotor is rotatable relative to the frame about a rotation axis or rotor axis which is upright but not necessarily vertical. The drive force for the rotation can be transmitted by the tractor, e.g., by a power take-off. The rake rotor comprises usually a plurality of tine arms that project outwardly away from the rotor axis. Each tine arm supports in turn a plurality of tines with which the stalk material is engaged. Optionally, the tine arm or a part of the tine arm to which the tines are connected can be pivotable about its longitudinal axis so that the tines can be pivoted alternatingly into a position close to the ground as well as into a position remote from the ground.

A catching element is correlated with the (or at least one) rake rotor. The catching element can be embodied e.g. as a rigid plate or grid or in particular as a flexible catching curtain or swath curtain. Its function resides in limiting the movement space of the stalk material that is engaged and thrown up or off by the rake rotor. This means that the stalk material impacts against the catching element and falls to the ground in its vicinity. In this way, a swath can be laid e.g. in the vicinity of the catching element. The catching element is connected to the frame by a support arm, i.e., the support arm forms the connection or suspension of the catching element in relation to the frame. A base part of the support arm is connected to the frame so as to be pivotable about a support arm axis in order to pivot the support arm between a lowered active position and a raised passive position. Correspondingly, the support arm axis in the normal operating position of the haymaking machine is not vertical but, for example, horizontal or at a minimal angle (smaller than 30°) to the horizontal. By a pivot movement about this support arm axis, the support arm can either be lowered into an active position, in which it can extend horizontally, for example, and in which the catching element is positioned close to the ground, or raised into a passive position in which the catching element is raised (clearly) off the ground. Even though here "one" passive position is mentioned, it should be clear that a plurality of passive positions are possible, for example, a slightly raised position for traveling through a headland and a more strongly angled raised position for traveling on a road. The base part can comprise a rotor protection for the rake rotor which is pivotable together with the base part. The rotor protection can be designed e.g. as a bracket and serves to prevent a collision between the rotating rake rotor and other objects. A sliding part to which the catching element is connected is slidable relative to the base part between an inner position and an outer position which is farther removed from the support arm axis. The sliding part is part of the support arm and is slidable translatorily relative to the base part. In particular, the base part can be a hollow profile in which the sliding part is partially received in order to enable a telescoping movement. A length adjustment of the support arm is realized by the displacement of the sliding part.

According to the invention, the sliding part is slidable into the inner position and the support arm is pivotable into the passive position by a linear drive which is acting between the frame and the sliding part, wherein a retaining mechanism is configured to hold the support arm in the active position until the sliding part has reached the inner position. The linear drive acts between the frame and the sliding part, wherein it is at least configured to generate a pulling force and to pull the sliding part in direction toward the frame. Based thereon, this initially results in the adjustment of the sliding part into the inner position, one could also say the retraction of the sliding part with the catching element arranged thereat. Moreover, also the upward pivoting of the support arm into the passive position is achieved by the pulling force. This is based on the connection of base part and sliding part, wherein the linear drive generates a torque in relation to the support arm axis. In order to achieve this, the linear drive (or the connecting line of its points of attack at the frame and at the sliding part) is non-radial in relation to the support arm axis. For example, the linear drive can be connected to the frame by a drive pivot axis which is arranged above the support arm axis and above the base part. In order to still ensure a sufficient torque for the vertical orientation of the support arm, the drive pivot axis should be displaced in addition horizontally relative to the support arm axis, namely on a side oppositely positioned to the catching element. The linear drive can be designed in particular as a cylinder or can comprise a cylinder, e.g., a hydraulic, electro-hydraulic or pneumatic cylinder.

Thus, two adjustment movements are realized by means of a single linear drive. In order to separate them from each other in a comprehensible repeatable manner for the user, the retaining mechanism according to the invention is provided that holds the support arm in the active position until the sliding part has reached the inner position. This means that when the sliding part is located in the outer position or between outer position and inner position, the support arm is essentially locked in the active position. Thus, an accidental pivoting of the support arm and a lifting of the catching element off the ground associated therewith is prevented during the length adjustment of the support arm. When the sliding part has reached the inner position, the retaining mechanism releases the support arm so that the latter can be pivoted into the passive position. By means of the retaining mechanism, the pivotability of the support arm into the passive position is thus causally coupled to the sliding part reaching the inner position. It is understood that the linear drive in general can also exert a pressure force which is opposite to the aforementioned pulling force by means of which the support arm can be pivoted out of the passive position into the active position and the sliding part is adjusted, i.e., extended, in direction to its outer position.

In principle, it would be conceivable to detect the position of the sliding part by means of a sensor that generates a signal that controls, in turn, the retaining mechanism. Such a configuration is however complex and generally also prone to failure. Therefore, it is preferred that the sliding part interacts mechanically with the retaining mechanism. In this context, a mechanical force transmission from the sliding part onto the retaining mechanism is directly or indirectly realized.

Preferably, it is provided that the retaining mechanism comprises a retaining element which is adjustably arranged at the frame and engages with the base part in a locking position and releases the latter in a release position. In this context, the retaining element can be embodied in particular as one piece. The retaining element is adjustable at least between the aforementioned locking position and the release position. Normally, in the locking position the retaining element produces a form fit with the base part so that the latter is retained or locked in relation to the frame. In addition or alternatively, the retaining element can also produce a force fit with the base part. The base part can interact directly but also indirectly mechanically with the retaining element.

Advantageously, the retaining element is arranged pivotably at the frame. This means that it is pivotable between the locking position and the release position. The pivotable adjustment has the advantage that it requires only a rotary bearing instead of e.g. a guide rail or the like, which would be required for a translatory adjustment.

Advantageously, the retaining element can be connected by a first spring element to the frame which loads the retaining element in direction toward the locking position. This means that, provided no other forces are acting on the retaining element, it is held in or moved into the locking position by the first spring element. In this way, a reliable locking action of the support arm is ensured also. The first spring element can be formed e.g. as a torsion spring or as a tension spring. When approaching the inner position, the spring force of the first spring element is overcome by the direct or indirect action of the sliding part.

Advantageously, the sliding part is configured to act directly on the retaining element when approaching the inner position and to push it out of the locking position. In this way, the entire mechanism is kept simple because intermediate elements for force transmission between sliding part and retaining element are dispensed with.

A preferred embodiment provides that the retaining element in the locking position is inserted partially in a recess of the base part wherein a retaining section of the retaining element engages behind a rim section of the base part that is formed at the rim side of the recess. The base part can be e.g. a hollow profiled section within which the sliding part is slidably guided also. The recess can be embodied as opening or cutout in a wall of the hollow profiled section. The retaining element is inserted partially in this recess in the locking position. At the rim of the recess, a rim section is formed that the retaining element engages from behind with a retaining section. Thus, due to the retaining section and the rim section a form fit between the retaining element and the base part is produced that leads to the locking action. The retaining section is normally configured as a projection on the retaining element.

Advantageously, the retaining element comprises a ramp section with which the base part interacts when approaching the active position in order to push the retaining element out of the locking position. The displacement of the retaining element can enable in particular the insertion into the recess of the base part. The ramp section is slanted in such a way relative to the movement direction of the base part that, because of the interaction, a force deflection results that displaces the retaining element. In this context, the base part and the ramp section glide along each other. In particular, the aforementioned rim section and the ramp section can interact with each other. This means that the rim section pushes first by interaction with the ramp section the retaining element out of the retaining position so that it can be inserted into the recess prior to it returning into the retaining position in which the retaining section engages from behind the rim section. When approaching the inner position, the sliding part can also interact with the ramp section in order to push the retaining element out of the retaining position.

While the locking mechanism prevents that the support arm pivots upwardly prior to the sliding part having been retracted, in general it cannot prevent that the sliding part is extended prior to the support arm having been pivoted out of the passive position downwardly into the active position. This is counteracted in a further development of the invention in that the base part is connected to the frame by a second spring element which loads the base part in the direction toward the active position. The second spring element generates a torque in the direction toward the active position thus assisting in downward pivoting action of the support arm. It can be embodied e.g. as a torsion spring or as a tension spring. The strength of the second spring element in relation to the strength of the linear drive can be selected such that pivoting into the passive position is impaired only insignificantly.

Preferably, the linear drive is configured to work for adjustment of the sliding part at a higher adjusting speed than for pivoting the support arm. This means that the adjustment of the sliding part happens comparatively quickly while pivoting of the support arm happens slower. One can also speak of a damping action of the linear drive in the region which corresponds to the pivot process. Provided the linear drive is designed as a hydraulic cylinder, it can be an end position damping action that can be realized e.g. in that inflow or outflow of hydraulic liquid is slowed near the end position.

BRIEF DESCRIPTION OF THE DRAWING

In the following, the invention will be described with the aid of Figures. The Figures are only examples and do not limit the general inventive concept.

PREFERRED EMBODIMENTS

Figure 1:
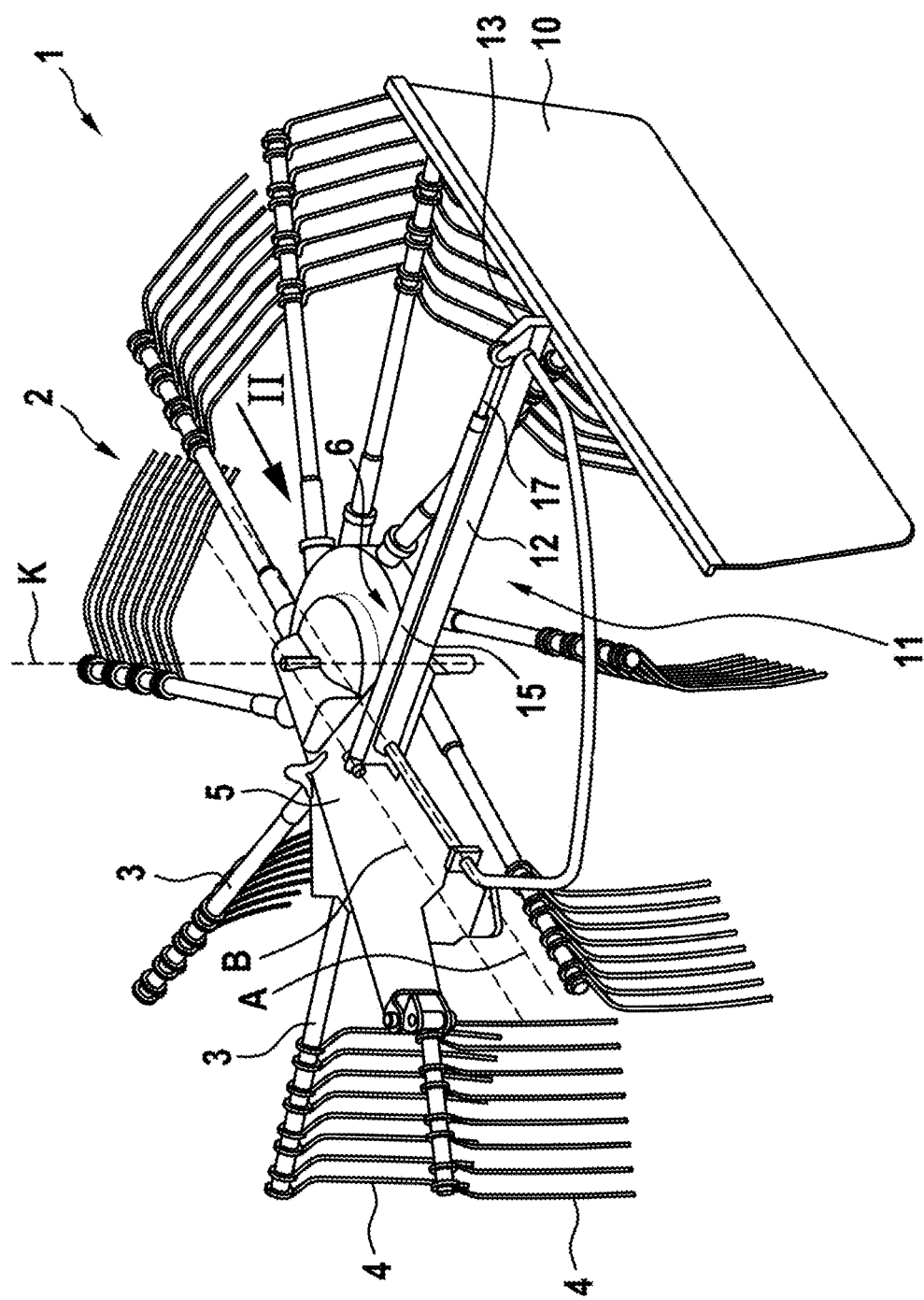
FIG. 1 shows a perspective illustration of a haymaking machine according to the invention.
Figure 2:
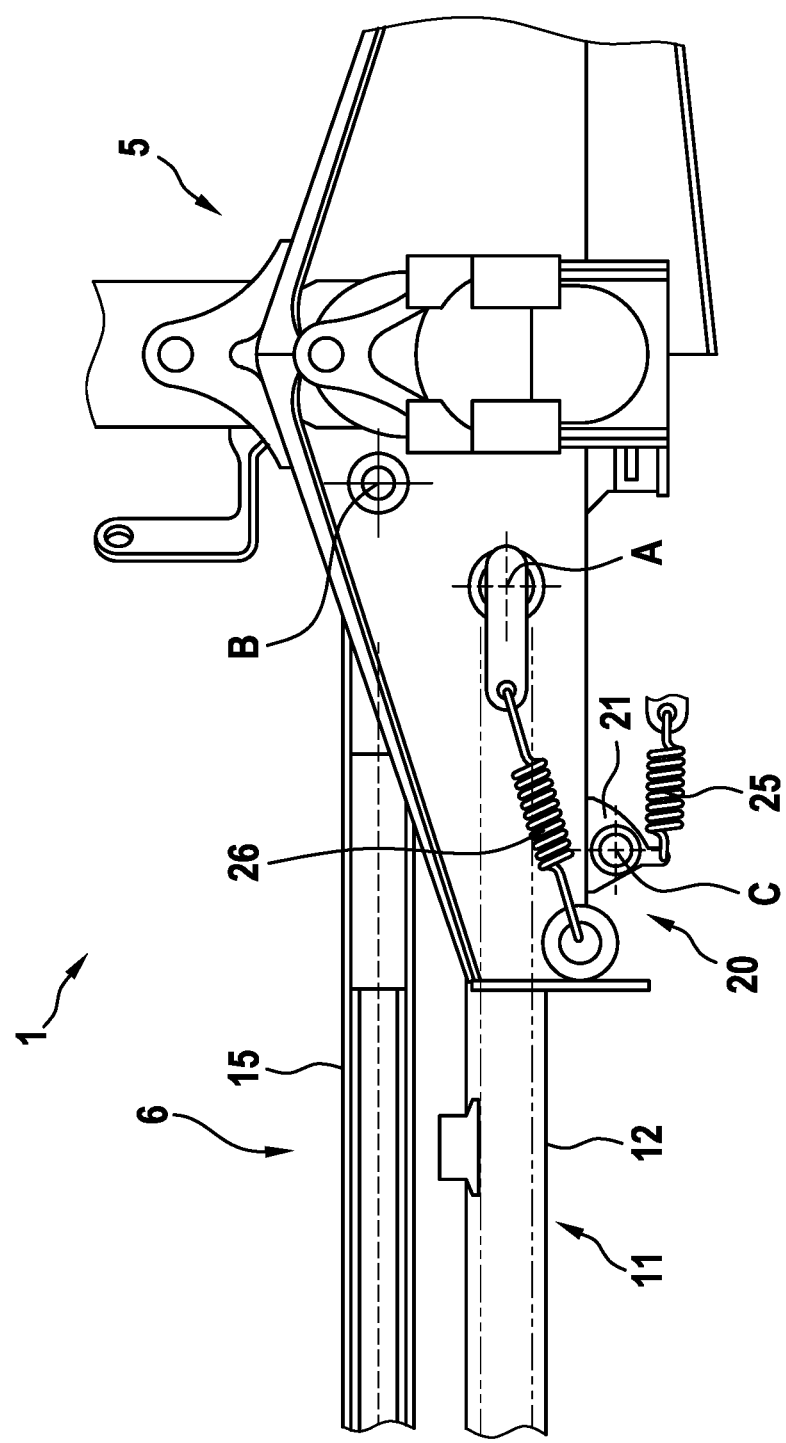
FIG. 2 shows a side view of a part of the haymaking machine in accordance with the direction II in FIG. 1.

FIG. 1 shows a haymaking machine 1, in this case a rotary rake, according to the present invention. A rake rotor 2 is rotatably supported about a rotation axis or rotor axis K on the frame 5. In this example, the rotor axis K extends vertically but could also be slanted in relation to the vertical. The rake rotor 2 comprises a plurality of tine arms 3, each carrying in turn a plurality of tines 4. In this example, each tine arm 3 is pivotable about its longitudinal axis so that, during the course of a rotation about the rotor axis K, the tines 4 are alternatingly pivoted between an approximately vertical position and an approximately horizontal position. In the approximately vertical position which can be seen in FIG. 1 in the left region of the rake rotor 2, the tines 4 are guided close to the ground so that they engage crop that is on the ground, more precisely stalk material such as grass or hay, and entrain it in accordance with the rotational movement of the rake rotor 2. In order to prevent that the crop is thrown off in an uncontrolled fashion, the haymaking machine 1 comprises a catching element 10 which in this case is designed as a swath curtain. In the position illustrated in FIG. 1, the catching element 10 extends vertically, namely outside of the rotation region of the rake rotor 2. Due to the closed areal configuration, the catching element 10 catches crop so that it can be laid in a defined position as a swath. Details of the function of the haymaking machine will be explained in the following in particular with relation to the detail view in FIG. 2 as well as in relation to the section illustrations in FIGS. 3-5 in which the section plane is parallel to the drawing plane in FIG. 2.

The catching element 10 is connected by a support arm 11 to the frame 5. The support arm 11 comprises a base part 12 that is connected to the frame 5 so as be pivotable about a horizontal support arm axis A as well as a sliding part 13 that is slidable above the base part 12 between an inner position (which is illustrated in FIG. 1) as well as an outer position which is farther removed from the support arm axis A. In this way, the catching element 10 can be positioned at a different distance to the rotor axis K and a swath width can be changed. Due to the pivotability of the base part 12, the support arm 11 as a whole can be pivoted between a lowered active position, illustrated in FIGS. 1-4, and a raised passive position, illustrated in FIG. 5. The movement of the sliding part 13 as well as the movement of the support arm 11 are effected by a hydraulic cylinder 6 functioning as a linear drive. The hydraulic cylinder 6 is connected by a drive pivot axis B to the frame 5. The drive pivot axis B extends parallel to the support arm axis A but is however vertically as well as horizontally displaced relative thereto, as can be seen in particular in FIGS. 2-5. The hydraulic cylinder 6 comprises a cylinder housing 15 with an interior 16 as well as a piston rod unit 17 which is slidable relative thereto. While the cylinder housing 15 is connected by the drive pivot axis B to the frame 5, the piston rod unit 17 is connected to the sliding part 13 as well as the catching element 10. By changing the pressure or the volume of a hydraulic liquid arranged in the interior 16, a force can be produced between the cylinder housing 15 and the piston rod unit 17. This force works, on the one hand, toward a displacement of the sliding part 13 relative to the base part 12, on the other hand, it generates a torque about the support axis A which works toward a pivot movement of the support arm 11.

Figure 3:
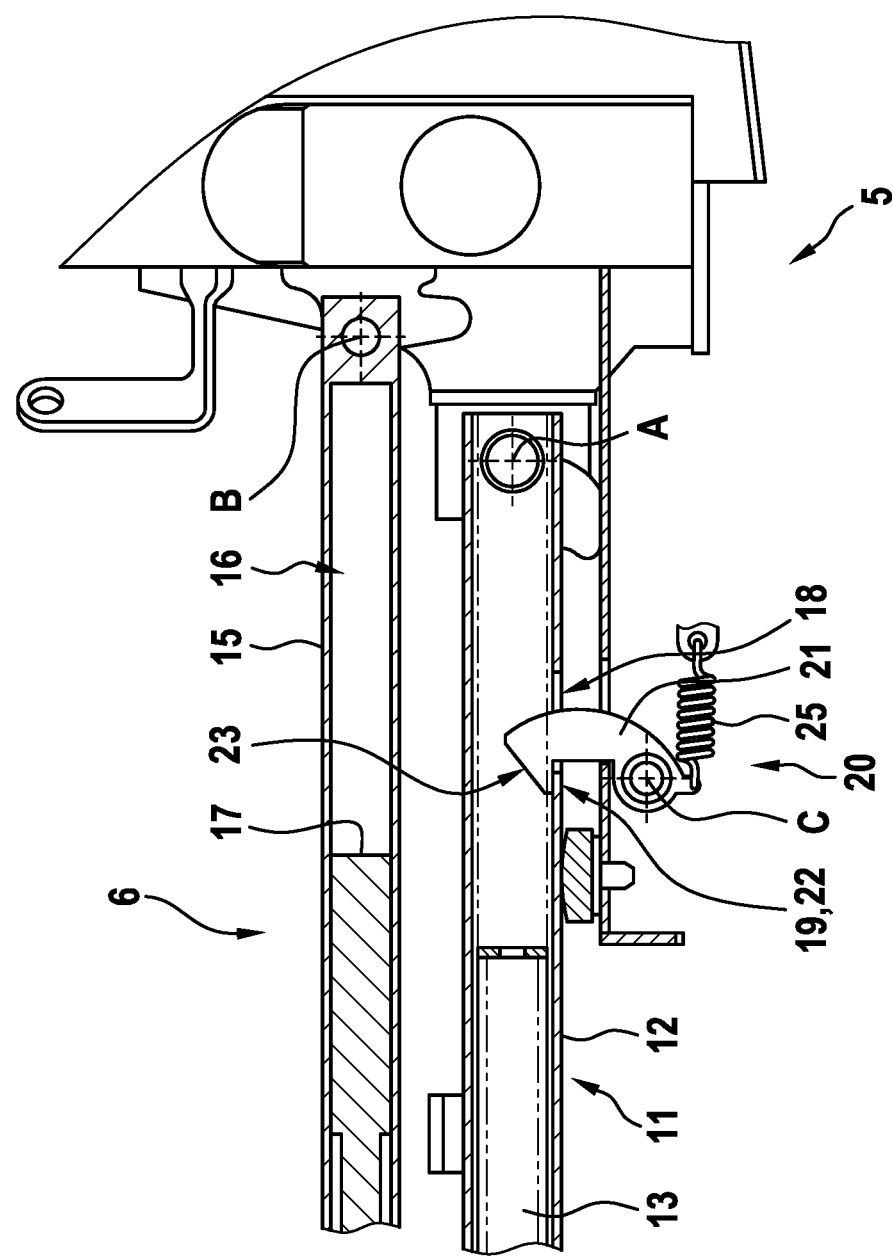
FIG. 3 shows a section illustration of the part of the haymaking machine of FIG. 2 in a first state.
Figure 4:
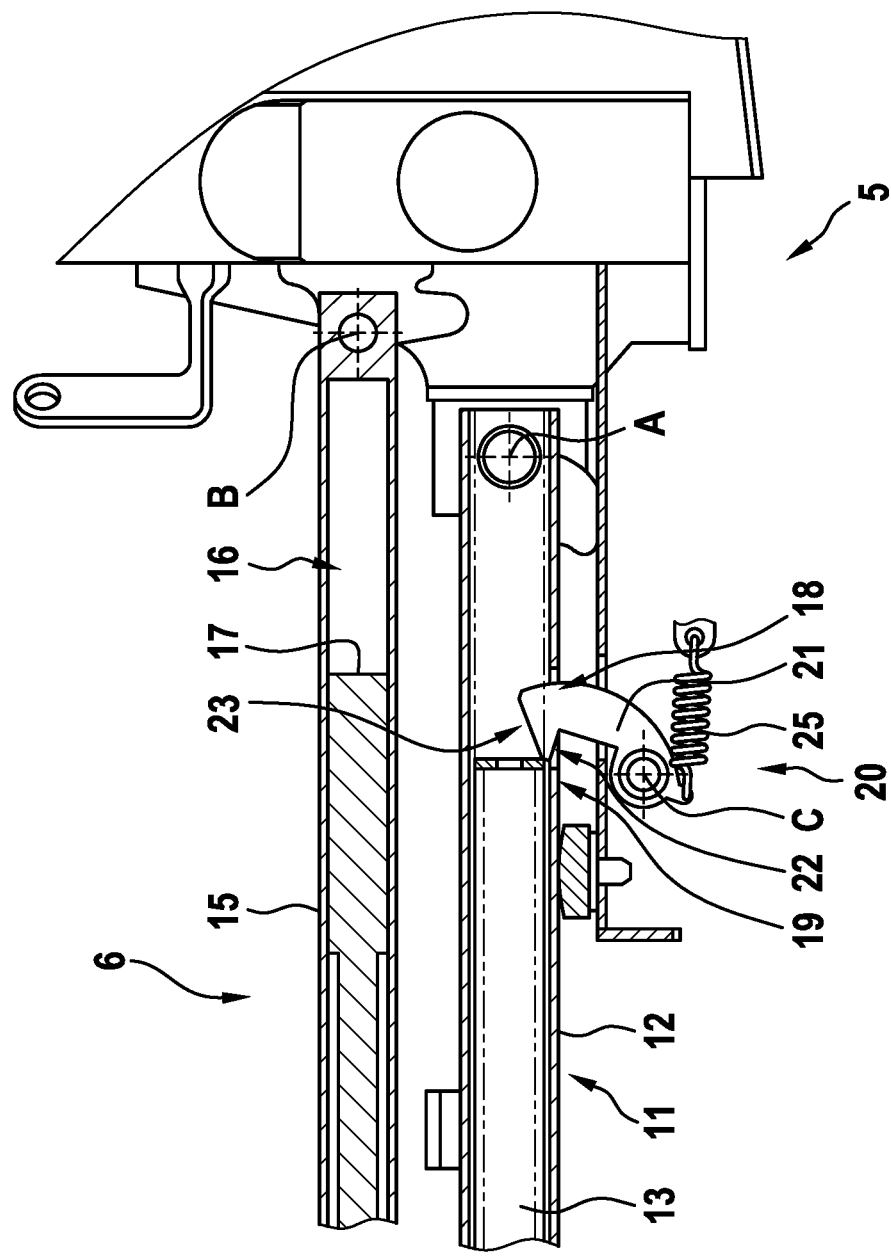
FIG. 4 shows a section illustration of the part of the haymaking machine of FIG. 2 in a second state.

For the interruption-free operation it must be prevented that the two movements overlap in an uncontrolled fashion. In particular, it is to be prevented that the support arm 11 pivots out of the active position upwardly into the passive position before the sliding part 13 has reached the inner position, i.e., essentially has been completely retracted. In order to ensure this, a retaining mechanism 20 is provided with a retaining element 21 that is supported at the frame 5 so as to pivot about a retaining element pivot axis C. While the support arm 11 is in the active position and the sliding part 13 has not yet reached the inner position, the retaining element 21 is inserted partially in a recess 18 of the base part 12. In this context, a projecting retaining section 22 of the retaining element 21 engages behind a rim section 19 which is formed laterally at the recess 18. Due to this form fit, the upward pivoting action of the support arm 11 relative to the frame 5 is prevented. A first spring element 25, which is here embodied as a coil spring, is intermediately positioned between the retaining element 21 and the frame 5 so that the retaining element 21 is pretensioned in the direction toward a locking position illustrated in FIG. 3. When due to the action of the hydraulic cylinder 6 the sliding part 13 is pulled in the direction toward the support arm axis A, the retaining element 21 remains first in the locking position until the sliding part 13 has reached the inner position. Upon reaching the inner position, the sliding part 13 impacts on the retaining element 21 and pushes it, as illustrated in FIG. 4, opposite to the force of the first spring element 25 out of the locking position into a release position. In this context, the sliding part 13 interacts partially with a slanted ramp section 23 of the retaining element 21.

Figure 5:
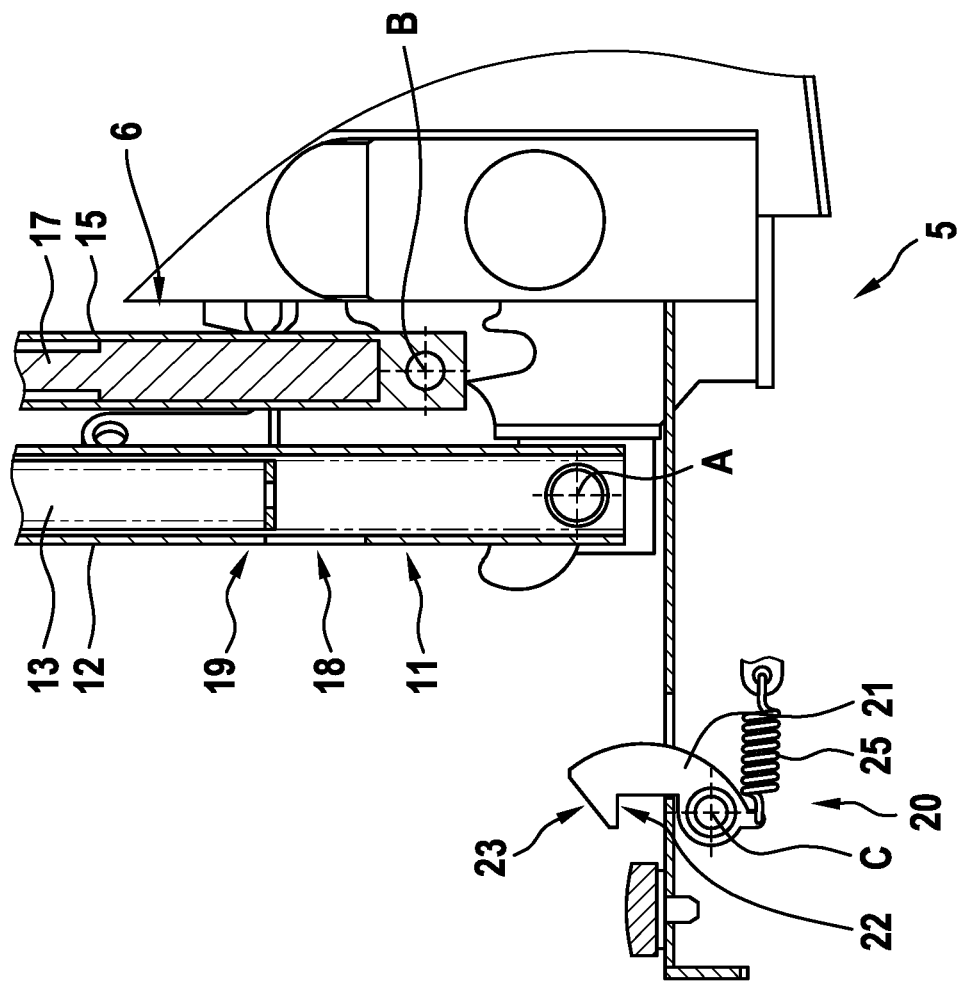
FIG. 5 shows a section illustration of the part of the haymaking machine of FIG. 2 in a third state.

Due to the adjustment of the retaining element 21 into the release position in which the form fit between the retaining section 22 and the rim section 19 has been canceled, the support arm 11, following the aforementioned torque, can pivot upwardly into the passive position which is illustrated in FIG. 5. The hydraulic cylinder 6 comprises in this context an end position damping action that ensures that the hydraulic liquid can leave or flow into the interior 16 less quickly when the piston rod unit 17 is located in the region of its end position, i.e., in closest proximity to the drive pivot axis B. The end position damping action ensures that pivoting of the support arm 11 is carried out relatively slowly while the displacement of the sliding part 13 between the inner position and the outer position is realized comparatively quickly.

Pivoting of the support arm 11 from the passive position back into the active position is realized, on the one hand, by the hydraulic cylinder 6 as well as, on the other hand, by a second spring element 26 that is also embodied as a coil spring and effects between the frame 5 and the base part 12 of the support arm 11. Due to this second spring element 26, an additional torque is produced that loads the support arm 11 in the direction toward the active position. In this way, pivoting into the active position is assisted and it is effectively prevented that the sliding part 13 adjusts in the direction toward the outer position before the support arm 11 has reached the active position. Upon reaching the active position, the rim section 19 of the base part 12 interacts with the ramp section 23. A force deflection is realized wherein the aforementioned sections 19, 23 glide past each other and the retaining element 21 is deflected out of the locking position so that it can be inserted into the recess 18 again before, following the tension of the first spring element 25, it again returns into the locking position as illustrated in FIG. 3.

What is claimed is:

1. A haymaking machine comprising:
   a rake rotor comprising a frame;
   a support arm comprising a base part and a sliding part, wherein the base part is connected to the frame so as to be pivotable about a support arm axis to enable the support arm to pivot between a lowered active position and a raised passive position, wherein the sliding part is configured to slide relative to the base part between an inner position and an outer position to effect a length adjustment of the support arm, wherein the outer position is farther removed from the support arm axis than the inner position;
   a catching element connected to the sliding part;
   a linear drive connected to the frame and to the sliding part and configured to move the sliding part into the inner position and to pivot the support arm from the active position into the passive position;
   a retaining mechanism configured to hold the support arm in the active position until the sliding part has reached the inner position;
   wherein the retaining mechanism comprises a retaining element adjustably arranged at the frame and configured to engage the base part in a locking position and release the base part in a release position.

2. The haymaking machine according to claim 1, wherein the sliding part is configured to interact mechanically with the retaining mechanism.

3. The haymaking machine according to claim 1, wherein the retaining element is pivotably arranged at the frame.

4. The haymaking machine according to claim 1, further comprising a spring connected to the retaining element and to the frame and configured to load the retaining element in a direction toward the locking position.

5. The haymaking machine according to claim 1, wherein the sliding part, when approaching the inner position from the outer position, is configured to act directly on the retaining element and configured to push the retaining element out of the locking position.

6. The haymaking machine according to claim 1, wherein the retaining element in the locking position is inserted partially in a recess of the base part, wherein a retaining section of the retaining element engages from behind a rim section of a rim of the recess.

7. The haymaking machine according to claim 1, wherein the retaining element comprises a ramp section, wherein the base part, when approaching the active position from the passive position, interacts with the ramp section to move the retaining element out of the locking position.

8. A haymaking machine comprising:
   a rake rotor comprising a frame;
   a support arm comprising a base part and a sliding part, wherein the base part is connected to the frame so as to be pivotable about a support arm axis to enable the support arm to pivot between a lowered active position and a raised passive position, wherein the sliding part is configured to slide relative to the base part between an inner position and an outer position to effect a length adjustment of the support arm, wherein the outer position is farther removed from the support arm axis than the inner position;
   a catching element connected to the sliding part;
   a linear drive connected to the frame and to the sliding part and configured to move the sliding part into the inner position and to pivot the support arm from the active position into the passive position;
   a retaining mechanism configured to hold the support arm in the active position until the sliding part has reached the inner position;
   a spring element connected to the base part and to the frame and configured to load the base part in a direction toward the active position.

9. A haymaking machine comprising:
   a rake rotor comprising a frame;
   a support arm comprising a base part and a sliding part, wherein the base part is connected to the frame so as to be pivotable about a support arm axis to enable the support arm to pivot between a lowered active position and a raised passive position, wherein the sliding part is configured to slide relative to the base part between an inner position and an outer position to effect a length adjustment of the support arm, wherein the outer position is farther removed from the support arm axis than the inner position;
   a catching element connected to the sliding part;

a linear drive connected to the frame and to the sliding part and configured to move the sliding part into the inner position and to pivot the support arm from the active position into the passive position;

a retaining mechanism configured to hold the support arm in the active position until the sliding part has reached the inner position;

wherein the linear drive is configured to work at a higher adjusting speed when adjusting the sliding part than when pivoting the support arm.

* * * * *